United States Patent
Clark (10) Patent No.: US 10,967,578 B2
(45) Date of Patent: Apr. 6, 2021

(54) 5D PART GROWING MACHINE WITH VOLUMETRIC DISPLAY TECHNOLOGY

(71) Applicant: Daniel S. Clark, Orangevale, CA (US)

(72) Inventor: Daniel S. Clark, Orangevale, CA (US)

( * ) Notice: Subject to any disclaimer, the term of this patent is extended or adjusted under 35 U.S.C. 154(b) by 0 days.

(21) Appl. No.: 15/924,184

(22) Filed: Mar. 17, 2018

(65) Prior Publication Data

US 2019/0016052 A1    Jan. 17, 2019

Related U.S. Application Data

(60) Provisional application No. 62/530,885, filed on Jul. 11, 2017.

(51) Int. Cl.
| | |
|---|---|
| *B29C 64/386* | (2017.01) |
| *B29C 64/135* | (2017.01) |
| *B33Y 50/00* | (2015.01) |
| *B33Y 30/00* | (2015.01) |
| *B33Y 10/00* | (2015.01) |
| *B29C 64/255* | (2017.01) |
| *B29C 64/357* | (2017.01) |
| *B29C 64/321* | (2017.01) |
| *B33Y 40/00* | (2020.01) |

(52) U.S. Cl.
CPC .......... *B29C 64/386* (2017.08); *B29C 64/135* (2017.08); *B29C 64/255* (2017.08); *B29C 64/321* (2017.08); *B29C 64/357* (2017.08); *B33Y 10/00* (2014.12); *B33Y 30/00* (2014.12); *B33Y 40/00* (2014.12); *B33Y 50/00* (2014.12)

(58) Field of Classification Search
CPC .............................. B29C 64/277; B29C 64/282
See application file for complete search history.

(56) References Cited

U.S. PATENT DOCUMENTS

| | | |
|---|---|---|
| 3,829,838 A | 8/1974 | Lewis et al. |
| 4,575,330 A | 3/1986 | Hull |
| 4,707,787 A | 11/1987 | Savit et al. |
| 4,752,498 A | 6/1988 | Fudim |
| 4,929,402 A | 5/1990 | Hull |
| 4,999,143 A | 3/1991 | Hull et al. |
| 5,006,364 A | 4/1991 | Fan |
| 5,071,337 A | 12/1991 | Heller et al. |
| 5,121,329 A | 6/1992 | Crump |
| 5,137,662 A | 8/1992 | Hull et al. |
| 5,139,338 A | 8/1992 | Pomerantz et al. |
| 5,143,663 A | 9/1992 | Leyden et al. |
| 5,174,931 A | 12/1992 | Almquist et al. |
| 5,182,055 A | 1/1993 | Allison et al. |
| 5,236,637 A | 8/1993 | Hull |
| 5,247,180 A | 9/1993 | Mitcham et al. |

(Continued)

OTHER PUBLICATIONS

Ruiz-Avila, Jaime, "Holovect: Holographic Vector Display", Kickstarter, https://www.kickstarter.com/projects/2029950924/holovect-holographic-vector-display, Oct. 2016 (Year: 2016).*

*Primary Examiner* — Galen H Hauth
(74) *Attorney, Agent, or Firm* — The Roy Gross Law Firm, LLC; Roy Gross (57) ABSTRACT

Methods and systems of and for using volumetric display technology including volumetric display technology to create three-dimensional objects for various industries, including, but not limited to solar, automotive and/or other technological areas that use 3D printing or additive manufacturing.

19 Claims, 3 Drawing Sheets

(56) References Cited

U.S. PATENT DOCUMENTS

| | | | |
|---|---|---|---|
| 5,248,249 A * | | 9/1993 | Yamamoto .............. B29C 64/35 118/620 |
| 5,248,456 A | | 9/1993 | Evans, Jr. et al. |
| 5,256,340 A | | 10/1993 | Allison et al. |
| 5,260,009 A | | 11/1993 | Penn |
| 5,263,130 A | | 11/1993 | Pomerantz et al. |
| 5,268,862 A | | 12/1993 | Rentzepis |
| 5,345,391 A | | 9/1994 | Hull et al. |
| 5,358,673 A | | 10/1994 | Heller et al. |
| 5,391,072 A | | 2/1995 | Lawton et al. |
| 5,427,733 A | | 6/1995 | Benda et al. |
| 5,437,820 A | | 8/1995 | Brotz |
| 5,447,822 A | | 9/1995 | Hull et al. |
| 5,506,607 A | | 4/1996 | Sanders et al. |
| 5,529,473 A | | 6/1996 | Lawton et al. |
| 5,545,367 A | | 8/1996 | Bae et al. |
| 5,569,431 A | | 10/1996 | Hull |
| 5,571,471 A | | 11/1996 | Hull |
| 5,573,721 A | | 11/1996 | Gillette |
| 5,609,812 A | | 3/1997 | Childers et al. |
| 5,609,813 A | | 3/1997 | Allison et al. |
| 5,630,981 A | | 5/1997 | Hull |
| 5,651,934 A | | 7/1997 | Almquist et al. |
| 5,653,925 A | | 8/1997 | Batchelder |
| 5,684,621 A | | 11/1997 | Downing |
| 5,711,911 A | | 1/1998 | Hull |
| 5,740,051 A | | 4/1998 | Sanders, Jr. et al. |
| 5,745,197 A | | 4/1998 | Leung et al. |
| 5,817,206 A | | 10/1998 | McAlea et al. |
| 5,891,382 A | | 4/1999 | Almquist et al. |
| 5,897,825 A | | 4/1999 | Fruth et al. |
| 5,902,537 A | | 5/1999 | Almquist et al. |
| 5,906,863 A | | 5/1999 | Lombardi et al. |
| 5,932,290 A | | 8/1999 | Lombardi et al. |
| 5,945,058 A | | 8/1999 | Manners et al. |
| 5,956,172 A | | 9/1999 | Downing |
| 5,965,079 A | | 10/1999 | Manners |
| 5,980,813 A | | 11/1999 | Narang et al. |
| 6,027,324 A | | 2/2000 | Hull |
| 6,048,487 A | | 4/2000 | Almquist et al. |
| 6,051,179 A * | | 4/2000 | Hagenau ................ B33Y 30/00 264/401 |
| 6,180,050 B1 | | 1/2001 | Arai et al. |
| 6,253,116 B1 | | 6/2001 | Zhang et al. |
| 6,261,507 B1 | | 7/2001 | Gigl et al. |
| 6,264,873 B1 | | 7/2001 | Gigl et al. |
| 6,266,167 B1 | | 7/2001 | Klug et al. |
| 6,305,769 B1 | | 10/2001 | Thayer et al. |
| 6,330,088 B1 | | 12/2001 | Klug |
| 6,391,245 B1 | | 5/2002 | Smith |
| 6,441,338 B1 | | 8/2002 | Rabinovich |
| 6,500,378 B1 | | 12/2002 | Smith |
| 6,508,971 B2 | | 1/2003 | Leyden et al. |
| 6,547,552 B1 | | 4/2003 | Fudim |
| 6,649,113 B1 | | 11/2003 | Manners et al. |
| 6,661,548 B2 | | 12/2003 | Klug et al. |
| 6,733,267 B2 | | 5/2004 | Chapman et al. |
| 6,813,594 B2 | | 11/2004 | Guertin et al. |
| 6,833,234 B1 | | 12/2004 | Bloomstein et al. |
| 6,836,736 B2 | | 12/2004 | Allen et al. |
| 6,942,830 B2 | | 9/2005 | Mulhaupt et al. |
| 7,052,263 B2 | | 5/2006 | John |
| 7,083,405 B2 | | 8/2006 | Koyagi et al. |
| 7,128,866 B1 | | 10/2006 | Henningsen et al. |
| 7,161,722 B2 | | 1/2007 | Brotherton-Ratcliffe et al. |
| 7,215,430 B2 | | 5/2007 | Kacyra et al. |
| 7,467,939 B2 | | 12/2008 | Sperry et al. |
| 7,550,251 B2 | | 6/2009 | McLean et al. |
| 7,568,904 B2 | | 8/2009 | Koyagi et al. |
| 7,573,561 B2 | | 8/2009 | Fries |
| 7,636,610 B2 | | 12/2009 | Schillen et al. |
| 7,783,371 B2 | | 8/2010 | John et al. |
| 7,785,093 B2 | | 8/2010 | Holmboe et al. |
| 7,790,093 B2 | | 9/2010 | Shkolnik et al. |
| 7,831,328 B2 | | 11/2010 | Schillen et al. |
| 7,858,913 B2 | | 12/2010 | Refai et al. |
| 7,894,921 B2 | | 2/2011 | John et al. |
| 7,968,626 B2 | | 6/2011 | Giller et al. |
| 8,017,055 B2 | | 9/2011 | Davidson et al. |
| 8,126,580 B2 | | 2/2012 | Ei-Siblani et al. |
| 8,167,999 B2 | | 5/2012 | Alam et al. |
| 8,252,223 B2 | | 8/2012 | Medina et al. |
| 8,506,862 B2 | | 8/2013 | Giller et al. |
| 8,562,324 B2 | | 10/2013 | Pettis |
| 8,747,097 B2 | | 6/2014 | Pettis |
| 8,992,202 B2 | | 3/2015 | Pettis |
| 9,022,770 B2 | | 5/2015 | Pettis |
| 9,034,237 B2 | | 5/2015 | Pettis |
| 9,205,601 B2 | | 12/2015 | DeSimone et al. |
| 9,211,678 B2 | | 12/2015 | DeSimone et al. |
| 9,213,312 B2 | | 12/2015 | Pyun et al. |
| 9,216,546 B2 | | 12/2015 | DeSimone et al. |
| 9,323,068 B2 | | 4/2016 | Xin et al. |
| 9,360,757 B2 | | 6/2016 | DeSimone et al. |
| 9,430,169 B2 | | 8/2016 | Pettis |
| 9,498,920 B2 | | 11/2016 | DeSimone et al. |
| 9,527,244 B2 | | 12/2016 | El-Siblani |
| 2002/0195748 A1 * | | 12/2002 | Farnworth ............. B33Y 10/00 264/401 |
| 2010/0125356 A1 * | | 5/2010 | Shkolnik ................ B33Y 80/00 700/98 |
| 2014/0023996 A1 * | | 1/2014 | Finn ....................... G09B 25/00 434/72 |
| 2016/0271875 A1 * | | 9/2016 | Brown, Jr. ............ B29C 64/386 |
| 2017/0129167 A1 * | | 5/2017 | Castanon ............... B33Y 40/00 |
| 2018/0015672 A1 * | | 1/2018 | Shusteff ................ G03H 1/0005 |
| 2018/0207876 A1 * | | 7/2018 | Querol Esparch ...... B29C 64/20 |
| 2018/0250890 A1 * | | 9/2018 | Claussen ............... B29C 64/135 |

* cited by examiner

3D OBJECT

FIG. 3A

3D CONTOUR DISPLAY

FIG. 3B

3D CONTOUR IMAGE

FIG. 3C

5D PART GROWING MACHINE WITH VOLUMETRIC DISPLAY TECHNOLOGY

CROSS-REFERENCE TO RELATED APPLICATION

The present application claims the benefit of priority of U.S. Provisional Patent Application Ser. No. 62/530,885 filed Jul. 11, 2017, entitled 5D PART GROWING MACHINE WITH VOLUMETRIC DISPLAY TECHNOLOGY. The contents of this application are hereby incorporated by reference into this application in its entirety.

FIELD OF THE INVENTION

The present invention is directed to a system and method for using three-dimensional ("3D") volumetric display vector techniques, computer and software controlled photonic energy emitters such as but not limited to ultraviolet ("UV"), visible light spectrum, and/or infrared ("IR") emitting and/or projection techniques, and photonic energy reactive, curable, or solidifying material to produce objects for various industries, including, but not limited to solar, automotive, and/or other technological areas that utilize known 3D printing or additive manufacturing techniques.

BACKGROUND OF THE INVENTION 3D printing refers to processes used to create a 3D object in which very thin layers of material are formed under computer control. Objects of near unlimited shape or geometry are produced using digital model data from a 3D model or other electronic data source such as a computer-aided design ("CAD") and/or stereolithography ("STL") files. Thus, unlike material removed or "hogged out" from solid stock as in conventional machining or lathe processes, 3D printing and/or additive manufacturing "builds" or "grows" a 3D object in accordance with digital model data by successively adding material layer upon layer in order to form an object.

Known 3D printing systems and methods include U.S. Pat. No. 4,575,330 to Hull, U.S. Pat. No. 5,956,172 to Downing, U.S. Pat. No. 8,126,580 to El-Silani et al. and U.S. Pat. No. 9,213,312 to Pyun et al. Additional existing known systems include U.S. Pat. Nos. 3,829,838, 4,575,330, 4,707,787, 4,752,498, 4,929,402, 4,999,143, 5,006,364, 5,071,337, 5,121,329, 5,137,662, 5,139,338, 5,143,663, 5,174,931, 5,182,055, 5,236,637, 5,247,180, 5,248,456, 5,256,340, 5,260,009, 5,263,130, 5,268,862, 5,345,391, 5,358,673, 5,391,072, 5,427,733, 5,437,820, 5,447,822, 5,506,607, 5,529,473, 5,545,367, 5,569,431, 5,571,471, 5,573,721, 5,609,812, 5,609,813, 5,630,981, 5,651,934, 5,653,925, 5,684,621, 5,711,911, 5,740,051, 5,817,206, 5,891,382, 5,897,825, 5,902,537, 5,906,863, 5,932,290, 5,945,058, 5,965,079, 5,980,813, 6,027,324, 6,048,487, 6,051,179, 6,180,050, 6,253,116, 6,261,507, 6,264,873, 6,266,167, 6,305,769, 6,330,088, 6,391,245, 6,441,338, 6,500,378, 6,508,971, 6,547,552, 6,649,113, 6,661,548, 6,733,267, 6,813,594, 6,833,234, 6,836,736, 6,942,830, 7,052,263, 7,083,405, 7,128,866, 7,161,722, 7,215,430, 7,467,939, 7,550,251, 7,568,904, 7,573,561, 7,636,610, 7,783,371, 7,785,093, 7,790,093, 7,831,328, 7,858,913, 7,894,921, 7,968,626, 8,017,055, 8,167,999, 8,252,223, 8,506,862, 8,562,324, 8,747,097, 8,992,202, 9,022,770, 9,034,237, 9,205,601, 9,211,678, 9,216,546, 9,323,068, 9,360,757, 9,430,169, 9,498,920, 9,527,244.

Disadvantageously however, known additive manufacturing or 3D printing systems and methods are time consuming because the required layering of material may take hours to days to produce even a small 3D object, thus, greatly limiting the overall size and quantity of desired 3D objects being produced.

Furthermore, 3D printing techniques are often limited as certain objects are not able to be produced with 3D printing, as producing layer upon layer prohibits the manufacturing of certain designs and configurations.

To overcome the disadvantages of the prior-art, it is desired to provide a novel system and method of producing 3D objects.

SUMMARY OF THE INVENTION

It is an object of the present invention to provide methods and systems of and for creating and/or producing 3D objects quickly using 3D volumetric display vector techniques.

It is an object of the present invention to provide methods and systems of and for creating and/or producing 3D objects using 3D volumetric display vector techniques utilizing photonic energy emitters and phonic energy reactive, curable, and/or solidifying material in combination with flood and drain additive manufacturing techniques.

It is an object of the present invention to provide methods and systems of and for creating and/or producing 3D objects using 3D volumetric display vector techniques utilizing a UV curable photopolymer in combination with flood and drain additive manufacturing techniques.

It is an object of the present invention to provide methods and systems of and for creating and/or producing 3D objects utilizing 3D volumetric display vector techniques including at least two, and preferably three or more, photonic energy emitters in combination with a UV reactive or curable material, such as a photopolymer, and flood and drain techniques. A platform, palette, or reservoir holds or contains the UV curable photopolymer, and photonic emitters produce a full and complete desired 3D image by application of volumetric display vectors. The method and system is facilitative of and for high-speed and/or high-volume production of 3D objects.

It is an object of the present invention to produce 3D objects utilizing 3D volumetric display vectors via high-speed layering and/or "flash emitting" of photonic energy to solidify or cure a UV photopolymer. Typically, such is not achievable because large UV projections cause the accumulation of excessive heat within the material or polymer, thus causing unwanted warp or distortion of a finished 3D object.

It is an object of the present invention to produce 3D objects using an "inside-out" technique, such that the volumetric internal layers of the 3D objects are created from the inside first, followed by outer layers being created after the volumetric internal layers are cured.

These and other objects of the invention are achieve by providing a system for producing three-dimensional objects, the system comprising: at least three photonic energy emitters; photonic energy curable material; and a flood and drain system, wherein the flood and drain system is configured to allow the photonic energy curable material to flood and drain within a chamber system, and wherein the at least three photonic energy emitters cure the photonic energy curable material to produce a three-dimensional object.

In certain embodiments, the chamber system includes an upper chamber, a pump and a lower chamber.

In certain embodiments, the lower chamber is a reservoir that stores the photonic energy curable material.

In certain embodiments, the chamber system includes an overflow port that returns the photonic energy curable material to the lower chamber In certain embodiments, the system further includes cryogenic cooling means, the cryogenic cooling means configured to cool the cure the photonic energy curable material. In certain embodiments, the cooling is via freezer with or without the cryogenic cooling means. In certain embodiments, the cooling of resin speeds up the volumetric 3D printing process.

In certain embodiments, the cryogenic cooling means is selected from a group consisting of Dry Ice or Liquid Nitrogen. In certain embodiments, cryogenic or other forms of cooling are used to control the exterior temperature of flood and drain tray and pentagon shaped build vat. In certain embodiments, the cooling is via a freezer, Refrigerator, or cryogenic cooling technique. In certain embodiments, the cooling keeps the resin from heating up.

In certain embodiments, there are additional methods to cool the resin. The resin container may have two hermetically sealed metal layers, such that liquid nitrogen is injected into the second outer layer. In this manner, the temperature of the resin in the first layer of the tank is controlled.

In certain embodiments, the cryogenic cooling means acts as a heat transfer device to remove heat from the system.

In certain embodiments, the photonic energy curable material is a UV photopolymer.

In certain embodiments, the volumetric 3d printing techniques are suitable for metals and ceramics in a photoreactive organic binder. In certain embodiments, the metal and ceramic materials use the same volumetric 3d printing process but use a UV cureable organic binder instead of a photonic energy curable material or photopolymer.

In certain embodiments, the photonic energy curable material includes other polymers or resins that are configured to interact with the at least three photonic energy emitters.

In certain embodiments, a UV curable photopolymer is applied in conjunction with the other resins and/or polymers.

In certain embodiments, the number of the at least three photonic energy emitters range from three photonic energy emitters to one thousand photonic energy emitters.

In certain embodiments, the system includes a build platform, wherein the three-dimensional object is cured upon the build platform.

In certain embodiments, the build platform includes a flat bottomed spherical vat.

In certain embodiments, the at least three photonic energy emitters are selected from a group consisting of a laser, LED projection system, LCD projection system, DLP projection system, LCOS projection system, 3d Printed SLM, SLA (Sterolithography), and combinations thereof.

In certain embodiments, the system uses a DLP projector instead of lasers.

In certain embodiments, the system uses a DLP projector in combination with lasers.

In certain embodiments, the system uses LCD, LED, LCD, LCOS, 3d Printed SLM, and DLP projection technology to create objects for various industries alone or in combination with lasers.

In certain embodiments, the at least three photonic energy emitters use volumetric display technology. In certain embodiments, the at least three photonic energy emitters are lasers and LED lights.

In certain embodiments, the least three photonic energy emitters use masers (microwave lasers) and microwaves. Microwaves and masers can penetrate deep in the photo reactive organic binder full of metals and ceramics.

In certain embodiments, the volumetric maser penetrates a thermal setting plastic.

In certain embodiments, the maser works like a laser (i.e., Microwave Amplification By Stimulated Emission OF Radiation). In certain embodiments, the maser works using a thermal initiator instead of a photo initiator.

In certain embodiments, the system produces multiple three-dimensional objects.

In certain embodiments, the multiple three-dimensional objects are sections of a larger three-dimensional object.

In certain embodiments, the multiple three-dimensional objects are created using an "inside-out" technique, whereby such that the volumetric internal layers of the 3D objects are created from the inside first, followed by outer layers being created after the volumetric internal layers are cured.

In certain embodiments, the at least three photonic energy emitters are arranged above the chamber system, wherein the at least three photonic energy emitters are configured to emit photonic energy into the chamber system to cure the photonic energy curable material Other objects of the invention are achieved by providing a method for producing three-dimensional objects, the method comprising: providing a system comprising at least three photonic energy emitters, a flood and drain system having a chamber system, and a build platform; providing photonic energy curable material; projecting a 3D image using the least three photonic energy emitters onto the build platform; flooding the photonic energy curable material into the chamber system, wherein the build platform is within the chamber system; draining the photonic energy curable material away from the chamber system while curing the photonic energy curable material in the shape of the 3D image, wherein the photonic energy curable material intersected by the photonic energy emitted by the least three photonic energy emitters cures the photonic energy curable material to produce a three-dimensional object.

In certain embodiments, the flood and drain system includes an upper chamber, a pump and a lower chamber, and wherein the photonic energy curable material flows from the lower chamber to flood the upper chamber, and returns to the lower chamber, while a portion of the photonic energy curable material is cured to form the three-dimensional object.

In certain embodiments, the three-dimensional object is configured be made in sections whereby the at least three photonic energy emitters create various three-dimensional objects that merge to form a larger three-dimensional object.

In certain embodiments, the step of projecting the 3D image using the least three photonic energy emitters onto the build platform occurs prior to the step of flooding the photonic energy curable material into the chamber system.

In certain embodiments, the step of projecting the 3D image using the least three photonic energy emitters onto the build platform occurs after the step of flooding the photonic energy curable material into the chamber system.

In certain embodiments, the method flashes a 3D image in a full vat of photonic energy curable material and 3D objects are created in seconds.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

In the following description, numerous details are set forth for the purpose of explanation. However, one of ordinary skill in the art will realize that the invention may be practiced without the use of these specific details.

The content of U.S. Pat. No. 5,745,197 is incorporated by reference into this application in its entirety.

For ease of understanding and conceptual visualization, the inventive concept is directed towards mass manufacturing of three-dimension objects including finished parts very quickly.

Additive manufacturing and/or 3D printers utilize UV or other type correlated emitters (i.e. lasers) to cure or solidify materials such photopolymers to "build" or "grow" 3D objects layer upon layer. However, there is no known technique that utilizes correlated 3D volumetric display vectors in combination with flood and drain techniques to build 3D objects quickly, efficiently, and without the limitations of known layer upon layer techniques, as used in conventional additive manufacturing or 3D manufacturing techniques.

In certain embodiments, the inventive system and method is directed to building entire and complete 3D objects quickly utilizing correlated 3D volumetric display vectoring.

In certain embodiments, the inventive system and method is used to mass produce 3D printed solar frames and other functional parts such as automotive parts and the like.

In certain embodiments, the instant invention is directed to correlated 3D volumetric display vectoring including a flood and drain process, and cryogenic cooling of a UV photopolymer utilizing dry ice, liquid nitrogen or other cryogenic cooling materials to substantially decrease 3D object build time.

In certain embodiments of the inventive system and method, 3D objects are not produced by layer upon layer additive manufacturing techniques; but rather are "grown and made" in larger reservoirs or vats of photonic energy reactive material, such as a photopolymer, at faster speeds utilizing "flash emitting" of photonic energy, and optionally with cryogenic cooling of the photonic energy reactive material.

In certain embodiments, the inventive system and method may include a build platform or palette, a UV curable resin or photopolymer, at least two photonic energy emitters lasers, and a pump. In certain embodiments, the system includes a build platform, a UV curable resin or photopolymer, three lasers, and a pump. In other embodiments, the system can include thousands of lasers.

In other embodiments, the inventive system and method may include a plurality of photonic emitters and various propagation lenses, reflectors, and/or mirrors.

In certain embodiments, the invention is directed to a volumetric display including a flood and drains process, and cryogenic cooling (using Dry Ice, Liquid Nitrogen or other cryogenic cooling materials) of a UV photo polymer to substantially decrease part build time. The three-dimensional objects created by the system, machine and method of the present invention are not made in layers like in 3D printing, rather the three-dimensional objects are grown and made in large sections of photo polymer at faster speeds without 1000 s of thin layers. With cryogenic cooling, and with the methods and systems of the invention, photo polymer parts can be made in sections rather than thin layers.

Figure 1:
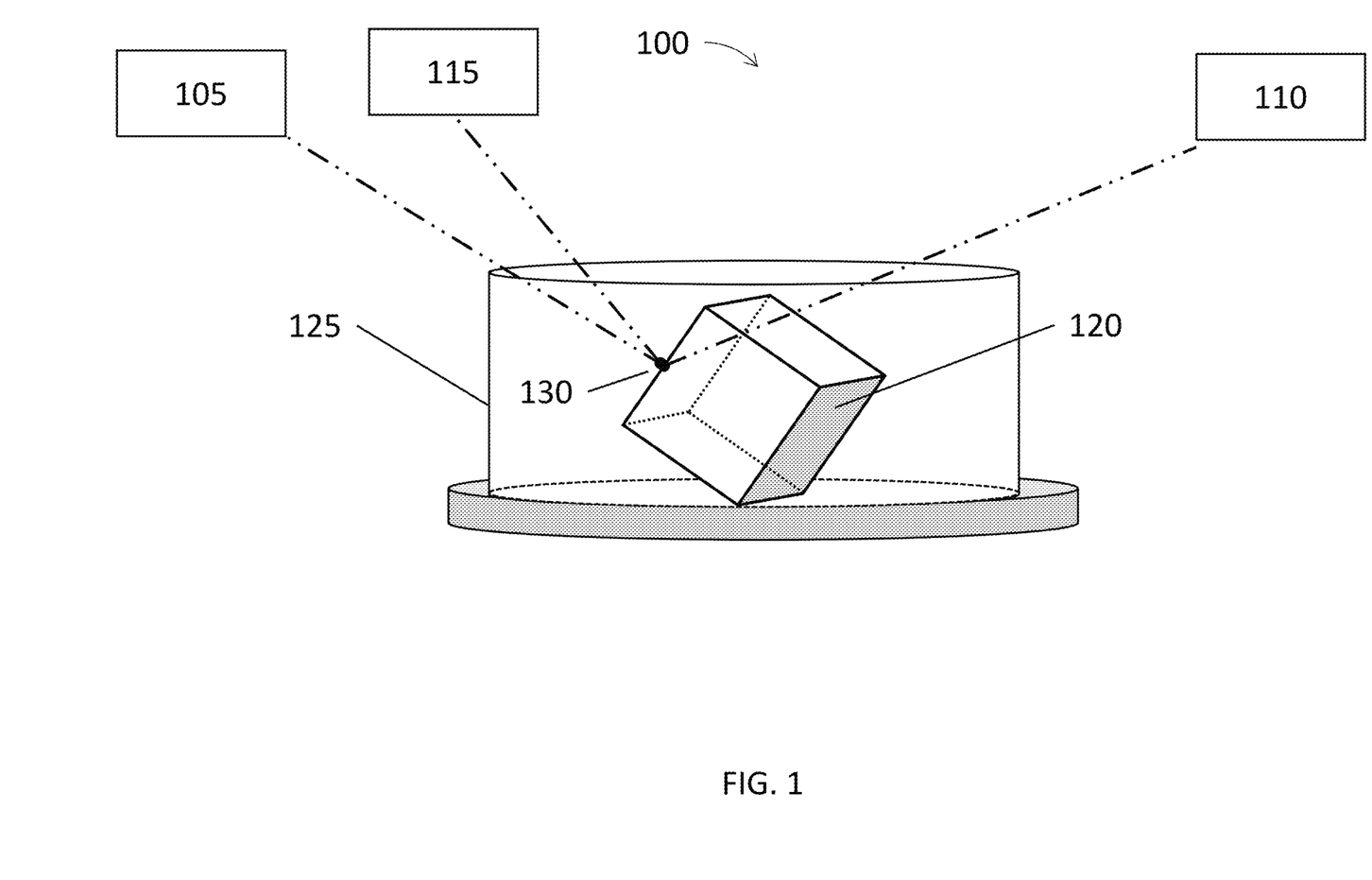
FIG. 1 depicts the inventive volumetric display vector system utilizing two photonic emitters.

As depicted in FIG. 1, the inventive system and method (100) includes at least two (preferably three) photonic energy emitters (105, 110, 115) producing a correlated photonic beam or vector to produce an object (120) within a vat or reservoir of photo-reactive material (125). The at least two (preferably three) photonic energy emitters (105, 110, 115) intersect at a convergence point (130) to cure or solidify the photopolymer material (125) to form the three-dimensional object (120). In this manner, the photonic energy emitters (105, 110, 115) project an image onto the vat or reservoir of photo-reactive material (125).

A key characteristic of the inventive system and method is that each correlated photonic energy emitters (105, 110, 115) alone is of insufficient wattage or power to cure or solidify the photo-reactive material (125); thus, allowing the beam or vector to pass through the photopolymer material. However, when the at least two distinct correlated photonic energy emitters (105, 110, 115) are converged at any point (130) within the photopolymer material (125), the combined wattage or power of the beams or vectors becomes sufficient to cure or solidify the photopolymer material (125) at the convergence point (130).

When the lasers meet together, they create the volumetric image and the combined the laser strength is strong enough to create the photo polymer reaction to cure the photo-reactive material (125).

In certain embodiments, the photonic energy emitters provide a volumetric image in the photo-reactive material (125). Within the system, the light is low and does not affect the resin. Once the photonic energy emitters provide sufficient light and flicker the volumetric image, the increase in light is used to make a 3D image, which in turn is sufficient to cure the photo-reactive material (125) and create a 3D volumetric object.

In certain embodiments, the strength of the photonic energy emitters is varied so that the light is increased in the photo-reactive material (125) and that a 3D volumetric object is created in layers.

In certain embodiments, the vat is a pentagon shaped vat. In certain embodiments, the vat is spherical. In certain embodiments the vat is cuboid, pentagonal and has a volume configured to be filled by the photo-reactive material (125).

Figure 2:
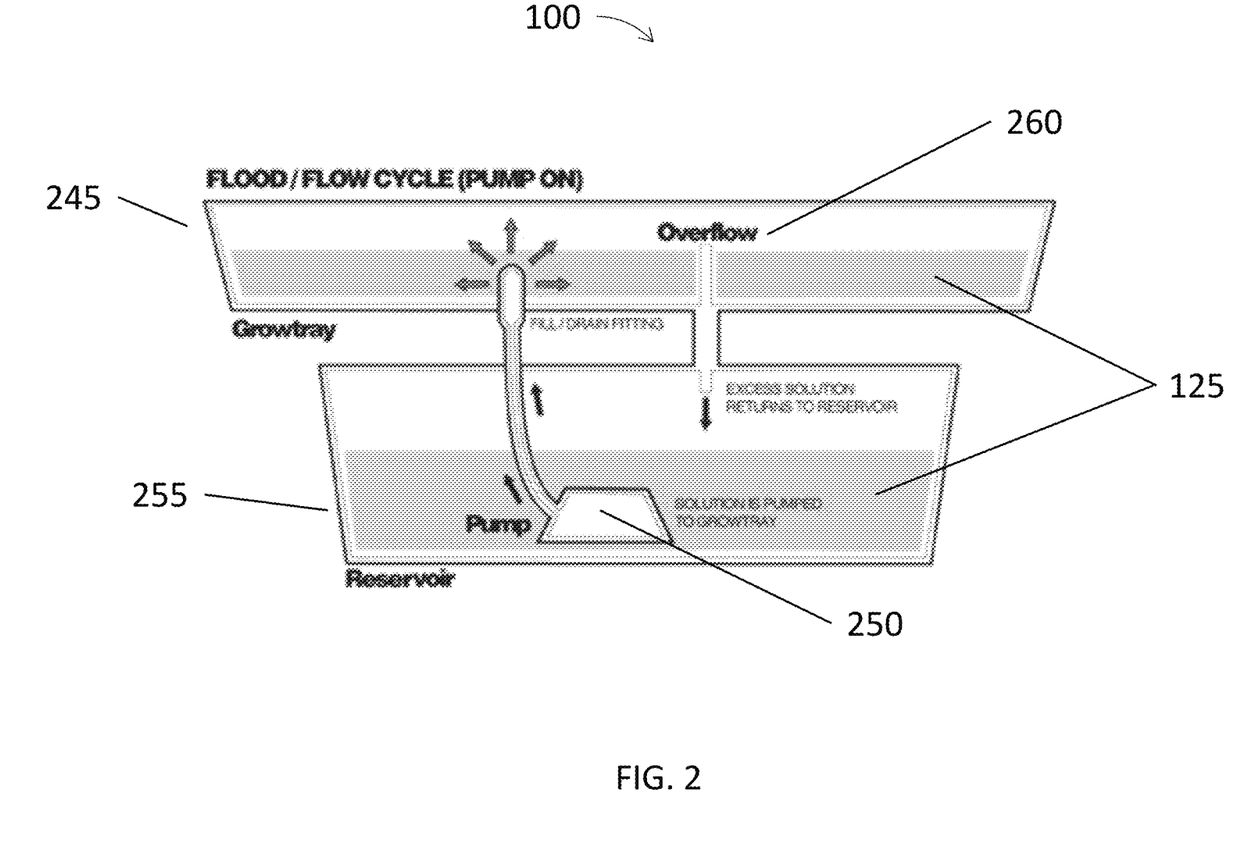
FIG. 2 depicts the inventive volumetric display vector system utilizing flood and drain growtray and reservoir.

As depicted in FIG. 2, certain embodiments of the instant invention include "flood and drain" techniques to supply photo-reactive material (125) to a flat bottomed "growing tray" (245) fed with photo-reactive material (125) via a pump (250) from a reservoir or vat (255).

In operation, such a configuration of the inventive system and method utilizes a pump (250) to flood the growing tray (245); the growing tray (245) including an overflow drain (260) which determines and maintains the photo-reactive material (125) depth in the growing tray (245) at a desired level while the 3D volumetric object (120) is produced as previously described and depicted in FIG. 1. As the grow tray (245) is flooded with the photo-reactive material (125) the 3D object design is projected by the photonic energy emitters (105, 110, 115) project an image onto the grow tray (245).

If the photo reactive material (125) is transparent or clear, the grow tray (245) may be flooded with the photo reactive material (125) until the 3D object (120) is completed by the system (100). If the photo-reactive material (125) has pigment or color, the projected design image might only be able to penetrate to a specific depth within the photo-reactive material (125) depending upon pigment color, photonic energy emitter (105) frequency or wavelength, and the refractive, reflective, and diffusion indexes of the photo-reactive material (125). An example of this dependency and variability is so-called "mirages", which occur when a portion of the photo-reactive material (125) contains differing, refractive, reflective, or diffusion indexes than another portion; causing correlated photonic energy beams or vectors to bend or reflect in an unexpected and undesired manner.

In certain embodiments, the system project or flashes a full volumetric Holovect (Lasers), LCD, LCD/LED, LED, SLA (Sterolithography) images in a completely full vat of photo polymer instead of the ebb & flow method.

In certain embodiments, the vat is flooded completely and then the full volumetric image is flashed in combination with one or more LED or SLA into the full resin tank then resin is drained.

In certain embodiments, the vat is flooded completely and then the full volumetric image is displayed or pulsed into the full resin tank then resin is drained.

In certain embodiments, the 3D Volumetric Image can be flashed or flickered in a completely full vat of photo polymer with no need to flood or drain.

In certain embodiments, the 3D Volumetric Image can be flashed, flickered or displayed in a completely full vat of photo polymer and once the part is made the vat is drained.

In certain embodiments, the method flashes a 3D image in a full vat of photonic energy curable material and 3D objects are created in seconds.

In certain embodiments, when the photo polymer is about a ¼-½ inch deep, the volumetric image is displayed in the resin then it ebbs upwards until volumetric part is complete.

In certain embodiments of the instant inventive system and method, the photo-reactive material (125) is cryogenically cooled (for example with liquid nitrogen and dry ice) to allow for faster processing of larger 3D objects (120) made up of thin layers of solidified photo-reactive material (125) similar as to additive manufacturing systems and methods.

In certain embodiments, the cryogenic cooling means any cooling at low temperatures. It is not well-defined at what point on the temperature scale refrigeration ends and cryogenics begins, but scientists assume a gas to be cryogenic if it can be liquefied at or below −150° C.

In certain embodiments, the reservoir (255) may be sealed to inhibit oxygen and oxygen diffusion. In certain embodiments, the reservoir is sealed (like a sealed freezer) to inhibit oxygen and keep the photo reactive material between 50 degrees Fahrenheit to negative 150 degrees Fahrenheit.

In certain embodiments, high or low viscosity resin is provided to help slow oxygen diffusion.

In certain embodiments, cryogenic cooling of the photopolymer (or other resins) enables substantially faster 3D object (120) production; allowing for 3D objects (120) to be produced while reducing or eliminating heat concerns which may warp or distort the final 3D object (120).

In certain embodiments, the cryogenic cooling of the photo polymer (or other resins), makes the parts substantially faster. The cryogenic cooling allows for the parts to be made while eliminating heat concerns that could warp the parts.

In certain embodiments, the inventive the system allows for parts to be created via chunks rather than layers. In certain instances, a part made by conventional 3D printing would take 1000 layers to make the part. Utilizing a system in accordance with the present invention, the part can be created in 10 by 10 continuous chunks or sections, thereby substantially decreasing time required to build an end product.

In certain embodiments, the inventive system may use large chunks or sections from object images and compile and use vects to project and build for example one-quarter ($\frac{1}{4}^{th}$) of a 3D object to meet any maximum size limitation of a printing or additive manufacturing device.

In certain embodiments, the system uses one or more of LCD, LED, LCOS, 3d Printed SLM, and/or DLP projector technologies. These techniques may be used in combination with lasers, or instead of lasers.

In certain embodiments, the system uses LCD, LED, LCOS, 3D Printed SLM, SLA (Sterolithography) and DLP projection technology to create objects for various industries alone or in combination.

In certain embodiments, it is also possible for Holovect, LCD, infrared LED, or combination of both LCD/LED to display, flash or pulse the full Volumetric 3D image to make volumetric parts with no layers involved.

Depending on the size of the object being build it could be necessary for the Volumetric 3D Image to be display, flashed or pulsed on and off.

In certain embodiments, the present invention can be used with various other volumetric display technologies as found in the following links:

http://voxon.co/technology-behind-voxon-3d-volumetric-display/ https://www.google.com.mx/amp/www.travelerstoday-.com/amp/articles/24367/20 161024/real-holographic-displays-becoming-thing-future-technology.htm https://uploadvr.com/xbox-cofounder-seamus-blackley-takes-rd-post-ar-firm-daqri/

The Voxon 3D volumetric display involves projecting a three-dimensional digital hologram in high definition and the present inventive system uses this technology with flood and drain technology to form three-dimensional objects.

LED-LCD Technique

In certain embodiments, numerous LED lights and/or lasers are used together with LCD projection depending upon the size of the vat storing the photo-reactive material. The LEDS are used to light up after or before the volumetric LCD image, which is displayed, pulsed, or flashed. First the volumetric LCD image is displayed then then the LED lights make it bright enough, so the photo polymerization happens.

The LEDs are combined with the Volumetric LCD as the volumetric LCD is not bright enough to make the photo polymerization reaction occur. But the volumetric LCD is such a weak light source that it is weak enough to fully penetrate the photo polymer when special concentrations of O2 and photo initiator are added. Then the LEDs are lit up and the photo polymerization of the volumetric LCD image occurs.

Inside-Outside Technique

In certain embodiments, the system projects full 3D images using an "inside-outside" technique. In this technique, the full 3D images are projected from the photonic energy emitters to an interior area of the 3D object to be cured. The interior portion of the 3D object to be made is first cured, followed by curing the exterior portion so that so that more complex and parts with larger volume can also be made from the inside out.

In certain embodiments, the infrared LEDs are able to be used as photonic energy emitters. In this embodiment, the infrared LEDs are used for non-transparent colored photopolymers, as the module sends out light with longer wavelengths than visible light. The longer wavelength light is configured to cure the curable material. The longer wavelengths from the infra-red led give the volumetric display the ability to penetrate deep in the resin.

Design Considerations

During cuing of the material, the ratio of oxygen (O2) to Resin and exposure time is very important. Too long of an exposure will solidify non-target areas and too short of an exposure will cause a fragile 3D primed object to be made, which is undesirable.

An exposure of light for too long of a period of time could result in deformation of the object.

Successive Stacking of Planar Layers

In certain embodiments, a 3D Printed SLM (Spatial Light Modulator) can also be used to project true 3D Volumetric Images to 3D Print Parts with no layers. A 3D Printed SLM is 3D in shape and projects 3d images while a normal SLM can only project 2d images.

In this manner, the inventive system can cure layers of curable material, so that parts are made in layers.

In certain embodiments, the inventive system includes creating volumetric layers similar to "Russian Matryoshka Dolls" whereby internal layers are cured first followed by external layers being cured.

In certain embodiments, the invention provides: a system for achieving a three-dimensional (3D) volumetric display by using a successive stack of transparent two-dimensional planar layers each having light-absorbing elements representing contours as dark features associated with individual respective slices through a three-dimensional object in a direction perpendicular to the plane of view of each of the planar layers so that the combined assembled volumetric display when viewed achieves a volumetric display which may be reconfigured using physical, chemical, electronic and computer-assisted means, so as to effect a dynamic volumetric display.

In this manner, photo-reactive material (125) is cured in volumetric layers to form 3D objects.

In certain embodiments, LCD Panels will use a successive stack of transparent two-dimensional planar layers to crest the Volumetric image.

Figure 3A:
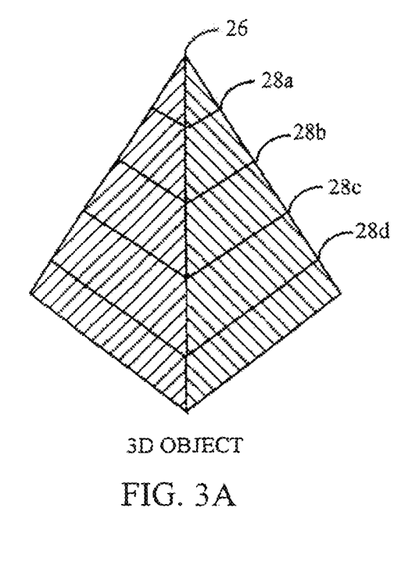
FIG. 3A illustrates a 3D object partitioned into image slices.
Figure 3B:
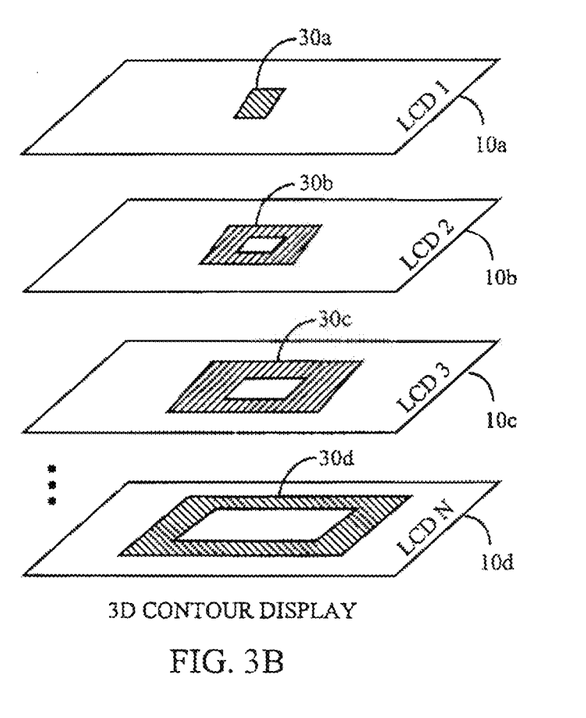
FIG. 3B illustrates stacked LCD panels with display slices displaying respective contours of respective image slices.
Figure 3C:
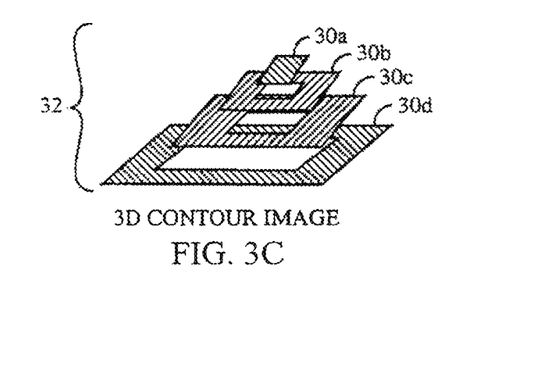
FIG. 3C illustrate the resulting displayed image of displayed contours.

Referring to FIGS. 3A, 3B and 3C, stacking of the liquid crystal display panels 10 forms the 3-dimensional volumetric display for viewing a 3D image 26. The image 26 is preferably imaged along image slices 28a, 28b, 28c through 28d preferably lying orthogonal to the 3D line of sight 20. The N LCD panels 10a, 10b, 10c through 10d display image contours 30a, 30b, 30c through 30d, respectively, corresponding to the image slices 28a, 28b, 28c through 28d. The image contours 30 are displayed as sets of data describing the information related to the associated contour of the image slices 28 of the 3D image 26. For examples, LCD panels 10 display data respectively representing slices 28. The top LCD panel 10a preferably displays data representing the upper positional information of image slice 28a of the 3D object 26. The bottom LCD panel 10d would represent the lower positional information of the image slice 28d of the 3-D object 26. Hence, there is preferably a respective and equal set of image slices 28 respectively corresponding to LCD panels 10 and image contours 30. The image contours 30a, 30b, 30c through 30d, when viewed as a stack, as shown in FIG. 2C, appear to a viewer as a solid 3D contour image 32 comprising superimposed contour slices 30a, 30b, 30c through 30d. Each display contour 30 a digitized representation of contour data that depicts and represents the associated image slice 28 within the original object 26. The larger the number of images slice 28 that describe the 3D object 26, the larger number of contour slices 30 required and the smoother and more continuous is the resulting displayed contour image 32. The image 32 created in the volumetric display 24 may also be viewed at angles which are off the axis normal 20 to the plane of the LCD panels 10. This format enables the displayed image 32 to be viewed for all angles less than ninety degrees and greater than five degrees with an aspect ratio of one to ten of image size to display size above the bottom plane 10d of the 3D volume 24. The panel display surface of polarizer 14 enables a wide range of viewing angles off the orthogonal line of sight 20. The observer needs no special training or equipment to view the 3D displayed image 32. Visual perception of 3D is readily apparent to the viewer. Further, the true display image 32 does not present the viewer with incorrect parallax motion in response to movement by the viewers.

Volumetric Imaging Technology

The invention involves advanced volumetric imaging technology. The volumetric imaging used via the photonic energy transmitters involves:

"This display is like a 3D printer for light. You're actually printing an object in space with these little particles."—Daniel Smalley, BYU electrical engineering professor . . . the new Optical Trap Display (OTD) technique, creates a 3D volumetric image by trapping and illuminating a particle with a laser, and then scanning the image in free space. Unlike a hologram, a volumetric image is created in free-space and is visible from any angle." BYU electrical engineering professor Daniel Smalley and co-authors publish their research ("A photophoretic-trap volumetric display') in the Jan. 24, 2018", https://youtu.be/1aAx2uWcENc The invention involves displaying a small particle that is dragged through space. The particle dragged through space forms the 3D image, which is projected into the photo-reactive material (125), which is cured in the shape of the 3D image and forms the object.

Holovect Technology (or "Mirage" Technology)

Holovect images are NOT holograms but instead are volumetric vector images projected onto modified air or onto a flat surface in 2D slices above 24 frames per second. (i.e. motion projections in space). A hologram may be defined as a recording of interference patterns on film or glass plates that contain three-dimensional information about an object dependent upon the angle at which it is viewed; (greek root "holo" meaning whole or complete, and "gram" meaning record). However, since Holovect images contain three-dimensional information and are "free-floating objects" in air or on a flat surface", or in other words they are "real-time 3D projections".

Holovect technology uses light. When light travels between two different mediums (such as air and a photo-reactive material) in most cases to one degree or another three different optical effects occur: refraction (degree of bend), reflection (degree of energy return from a surface or material over a wavelength spectrum), and/or diffusion (mixing or dispersing of wavelengths over a spectrum), depending on the different "refractive index" (RI) of the materials. An example of this is "Smokey Room Mirages", which occur when a portion of air or a material has a different RI than its surroundings, causing light beams to bend and be reflected accordingly and yet in unexpected ways. This may also happen due to temperature or pressure differences from one region of a material or a gas to another region. Such a known system is the Holovect Mk II by Holovect Industries which is capable of drawing a complete image 50 times per second within a 12 cm by 12 cm by 12 cm cube called a "drawbox".

"Vect objects" are/is data-structures developed for Holovect projection systems. Simply described, "vect objects" are a listing of 3D coordinates that result in lines drawn in a head-to-tail sequence or raster in space corresponding to additive manufacturing control applications. Such "vect object" files are straightforward and easy to create using a variety of known online tools, spreadsheets, or even pencil and graph paper. Once loaded, "vects" or "vector objects" can be rotated in three axes and repositioned within a cubic canvas. These vect objects may also be easily controlled and manipulated using an interface, preset functions such as spin and move, or used within other design, control, and/or other applications.

In combination with known so-called "holovect technology", it is possible to control and modify gas or air within a volume of 3D space to precisely modify the RI within specific regions of that space to refract and reflect photonic energy such as but not limited to laser beams. This modification raises the "albedo" which is defined as the proportion of the incident light that is reflected by a surface, as well as the refractive properties at the boundary between the modified and unmodified air. Therefore, by simultaneously controlling the aim of one or more lasers and the position of a modified air column, a computer may place a volumetric pixel or "voxel" of light anywhere within that volume of 3D space. Then by maintaining a laser energized from point A to point B a line or vector is drawn in 3D space, and by joining many 3D vectors in a sequence a holographic vector object may be generated.

In certain embodiments, the photonic energy emitters provide an actual 3D volume displays the original 3D information by using a material within the 3D volume comprising substances which can emit visible light under localized fluorescence excitation. Each voxel is individually addressed using multiple laser beams, having intensity and wavelength so arranged that the fluorescence is only significantly exhibited in a voxel where all the individual beams come together. An actual transparent 3D volume is used to render the original 3D information. Disadvantageously, the volume which will contain the 3D image must be a special homogeneous material, along with careful tailoring of the laser excitation source, so as to enable the 3D display to become visible. The confluence of these specific material and radiation properties are disadvantageously required to enable the device to function. These systems teach the construction of 3D volumetric display using expensive homogeneous materials and disadvantageously require special fluorescence requirements of the materials within the 3D volumetric light radiant structure using fluorescence-exciting lasers.

Holovect Technology in Combination with UV Photo Polymers

In certain embodiments, the present invention in part is directed towards utilizing known holographic vector display technologies, and "vects" or "vector objects", in combination with a UV curable photopolymer for producing 3D objects.

In certain embodiments, image files are loaded into a holographic vector display technology system, the images are converted to "vects" and drawn into the air with visible light and a curable photo-polymer solidified is accordance with the parameters specified in an "vect object" files.

In certain embodiments, the present invention incorporates open source volumetric display technology with the inventive and improved part growing method to produce articles faster and more accurately than known conventional 3D printing or additive manufacturing systems.

In certain embodiments, the present invention may be used with various other volumetric display technologies.

Flood and Drain Technology

The concept for a 5D Part Growing System includes a flood and draining photo-polymer and three lasers coming from different points to make an object. The laser can only go so deep in a photo polymer and helps create and make the object.

A spherical vat positioned under the circle spherical area and includes a UV curable photo-polymer. In certain embodiments, the UV curable photo-polymer is doped with oxygen and photo initiator, such that there is no limit to the depth that the volumetric image can travel.

The system is a voxel part growing machine, as the photo polymer before it floods to the grow tray is cryogenically cooled with liquid nitrogen and dry ice. This is how the photo polymerization process speeds up from small thin layers like conventional additive manufacturing to large sections in 5D Part Growing.

The resin is below and it's cryogenically cooled and the container is like a mini freezer that keeps the photo polymer very cold below zero (liquid nitrogen is provided to regulate the temperature).

Then the pump or siphon pumps up the photo polymer (aka 3D Printing Resin) slowly to the top tray or vessel depicted in the. PNG file below where the lasers display a 3D image using holovect technology as shown in (https://youtu.be/kPW7ffUr81g).

In certain embodiments, the photo polymer stays in the reservoir below then it ebbs and flows. The pump causes the UV curable photo polymer to fill (flood) the system until it fills the spherical vat.

When the photopolymer filling/flooding the system reaches the selected tube height, it drains back down to the reservoir where it can be reused or recirculated back again. There is a siphon with a filter that allows particular matter to be filtered before entering back into the container. The siphon allows the UV curable photo polymer to back down into the reservoir through the pump (draining the system).

Scalability

The system allows for parts to be created via chunks rather than layers. In certain instances, a part made by conventional 3D printing would take 1000 layers to make the part.

Using the 5D system of the present invention, the part can be created in 10-10 continuous chunks, thereby increasing the speed of part build time substantially.

The system allows for full 3D parts to be created or in chunks.

In certain embodiments, the system can use large chunks from images so therefore in these embodiments, projected chunks of a ¼ of the image at a time can be used or whatever the maximum limitation the device can project at one time, with LCD, DLP, and LCOs then it could just be flooded and drained.

Build Process

In certain embodiments, the system has non-stick silicone similar to parchment paper on the bottom of the grow tray as that is the build plate. Then the full 3D Volumetric Display is displayed to lay flat on the grow tray while it is flooding.

In certain embodiments, LCD/LED, LED, Infrared LED, 3d Printed SLM, and SLA (Sterolithography) are used with the system. In certain embodiments. In certain embodiments, each of these techniques can be used in combination with the Volumetric LCD Panel.

The part is made on the system while Resin is flowing up not ebbing down, which involves the creation of parts without using layers (such as in conventional 3D printing). In certain embodiments, if the resin has a has viscosity ((Thick Heavy Resin) the full part can be made while floating in the resin).

The system worked by having an image sitting flat on the flood tray floor.

The bottom of the flood tray has an anti-stick Teflon coating or Parchment paper so once the part is made it can pull right off.

The system and process starts bottom up as a little photo polymer like a half inch is in the flood tray then the laser put the object in the UV curable photo polymer. Then it is slowly pumped up from reservoir into the grow tray as the grow tray is filled with goo the part is made.

In certain embodiments, the photo polymer has high viscosity.

EXAMPLE 1

Proof of Concept

An inventive proof of concept was created whereby a heart shaped photo polymer was cryogenically cooled with liquid nitrogen then was maintained under two pieces of dry ice. Afterwards, sunlight was concentrated on it and turned into a fully functional part with no layers in 3 seconds (https://instagram.com/p/BTp7g1KDRwN/).

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

What is claimed is:

1. A method for producing three-dimensional objects, the method comprising:
    providing a system comprising
        at least three photonic energy emitters, wherein at least one of the at least three photonic energy emitters is a DLP projector,
        a flood and drain system having a chamber system, and a build platform;
    providing photonic energy curable material;
    projecting a 3D image using the at least three photonic energy emitters onto the build platform;
    flooding the photonic energy curable material into the chamber system, wherein the build platform is within the chamber system;
    draining the photonic energy curable material away from the chamber system while curing the photonic energy curable material in the shape of the 3D image at a convergence point; and
    cryogenic cooling the photonic energy curable material prior to the step of flooding the photonic energy curable material into the chamber system, wherein the cryogenic cooling speeds up the curing of the photonic energy curable material;
    wherein one of the at least three photonic energy emitters alone is of insufficient wattage or power to cure or solidify the photo-reactive material, thus, allowing a beam or vector to pass through the photopolymer material,
    wherein the photonic energy curable material intersected by the photonic energy emitted by at least two of the at least three photonic energy emitters cures the photonic energy curable material to produce a three-dimensional object at the convergence point, such that the combined wattage or power of the beams or vectors becomes sufficient to cure or solidify the photopolymer material, and
    wherein the step of projecting the 3D image using the least three photonic energy emitters onto the build platform occurs prior to the step of flooding the photonic energy curable material into the chamber system,
    wherein the photonic energy curable material is a UV photopolymer.

2. The method of claim 1, wherein the flood and drain system includes an upper chamber, a pump and a lower chamber, and wherein the photonic energy curable material flows from the lower chamber to flood the upper chamber, and returns to the lower chamber, while a portion of the photonic energy curable material is cured to form the three-dimensional object.

3. The method of claim 1, wherein the three-dimensional object is configured to be made in sections whereby the at least three photonic energy emitters create various three-dimensional objects that are configured to merge with one another to form a larger three-dimensional object external to the chamber.

4. The method of claim 1, wherein the cryogenic cooling is performed via Dry Ice or Liquid Nitrogen.

5. The method of claim 1, further comprising cooling the photonic energy curable material via a freezer or refrigerator.

6. The method of claim 1, wherein the photonic energy curable material is a UV photopolymer.

7. The method of claim 1, wherein the photonic energy curable material is cured from an inside first layer to an outside layer.

8. The method of claim 1, wherein the 3D image projected via the at least three photonic energy emitters uses the combined wattage or power of the three photonic energy emitters to cure the photonic energy curable material.

9. The method of claim 1, wherein the at least three photonic energy emitters include up to one thousand photonic energy emitters.

10. The method of claim 1, wherein the at least three photonic energy emitters pulse the 3D image.

11. The method of claim 1, wherein the at least three photonic energy emitters flash or flicker the 3D image.

12. The method of claim 1, wherein the three-dimensional object is produced in chunks.

13. The method of claim 1, wherein the cryogenic cooling means acts as a heat transfer device to remove heat from the system.

14. The method of claim 13, wherein the chamber system has two hermetically sealed metal layers, such that the cryogenic cooling means is injected into the outer layer.

15. The method of claim 2, wherein the lower chamber is a reservoir that stores the photonic energy curable material.

16. The method of claim 2, wherein the chamber system includes an overflow port that returns the photonic energy curable material to the lower chamber.

17. The method of claim 1, wherein the at least three photonic energy emitters project images via LCD, LED, LCOS, 3d Printed SLM, and/or DLP projector technologies.

18. A method for producing three-dimensional objects, the method comprising:
    providing a system comprising
        at least three photonic energy emitters, wherein at least one of the at least three photonic energy emitters is a DLP projector,
        a flood and drain system having a chamber system, and
        a build platform;
    providing photonic energy curable material;
    projecting a 3D image using the at least three photonic energy emitters onto the build platform;
    flooding the photonic energy curable material into the chamber system, wherein the build platform is within the chamber system;
    draining the photonic energy curable material away from the chamber system while curing the photonic energy curable material in the shape of the 3D image at a convergence point;
    wherein one of the at least three photonic energy emitters alone is of insufficient wattage or power to cure or solidify the photo-reactive material, thus, allowing a beam or vector to pass through the photopolymer material,
    wherein the photonic energy curable material intersected by the photonic energy emitted by at least two of the at least three photonic energy emitters cures the photonic energy curable material to produce a three-dimensional object at the convergence point, such that the combined wattage or power of the beams or vectors becomes sufficient to cure or solidify the photopolymer material,
    wherein the step of projecting the 3D image using the least three photonic energy emitters onto the build platform occurs after the step of flooding the photonic energy curable material into the chamber system, and
    wherein the photonic energy curable material is a UV photopolymer.

19. The method of claim 1, wherein all three of the at least three photonic energy emitters are DLP projectors.

* * * * *